Feb. 16, 1926.

R. E. TUTHILL 1,573,433

WAX FORM COMPRESSOR FOR INDIRECT INLAY SYSTEMS

Filed May 28, 1925

Inventor
Roy E. Tuthill
By Wooster & Davis
Attorneys

Patented Feb. 16, 1926.

1,573,433

UNITED STATES PATENT OFFICE.

ROY E. TUTHILL, OF BRIDGEPORT, CONNECTICUT.

WAX-FORM COMPRESSOR FOR INDIRECT INLAY SYSTEMS.

Application filed May 28, 1925. Serial No. 33,451.

*To all whom it may concern:*

Be it known that I, ROY E. TUTHILL, a citizen of the United States, residing at Bridgeport, county of Fairfield, State of Connecticut, have invented new and useful Wax-Form Compressors for Indirect Inlay Systems, of which the following is a specification.

This invention relates to a device for making the wax forms used in making inlays by the indirect method. In making inlays by the indirect method, after the cavity in the tooth has been prepared an impression is made of this cavity and a die or mold is made from this impression, so that this die, usually of silver, is substantially a reproduction of the tooth with the prepared cavity in it. Then this cavity in the die is filled with inlay wax and the outer or biting face is carved in the exposed surface of the wax. After this wax inlay or form has been prepared the gold inlay is cast using this wax inlay as a form or pattern, and then the cast inlay is fastened in the cavity in the tooth by means of cement. This indirect method is more desirable than the direct method because the greater part of the work in preparing the inlay may be performed in the laboratory instead of by direct operation on the tooth of the patient. Of course, the chief difficulty is in preparing an inlay which will exactly fit the cavity in the tooth. Heretofore, difficulty has been experienced in making the inlay wax conform properly to the walls of the cavity in the die. Sometimes the wax was melted into the cavity and sometimes it was merely pressed into the cavity with the fingers, but both of these methods was unsatisfactory for fine work as the wax did not flow sufficiently to fit all the uneven surfaces in the cavity and to fill all the recesses. As a result the cast inlay made from this wax form did not fit the cavity in the tooth with the desired accuracy and it was, therefore, difficult to fasten it in the cavity. There might be a clear line between the surface of the tooth and the inlay and there might be sufficient space between the surface of the cavity and the inlay for foreign substances to enter, eventually causing decay and the inlay to loosen and drop out.

It is, therefore, an object of my invention to provide a device by which the inlay wax may be caused to exactly fit all the irregularities of the surface of the cavity in the die, and therefore, fill all the recesses and give a form or pattern for the inlay which conforms exactly to the surface configuration of the cavity in the tooth, so that the inlay which is cast from this wax form or pattern will exactly fit the surface of the cavity in the tooth, eliminating the objections above noted.

With the foregoing and other objects in view, I have devised the construction illustrated in the accompanying drawing forming a part of this specification, similar reference characters being employed throughout the various figures to indicate corresponding elements. In this drawing, Fig. 1 is a side elevation and partial vertical section of a form of device constructed to carry out my invention.

Figure 1:
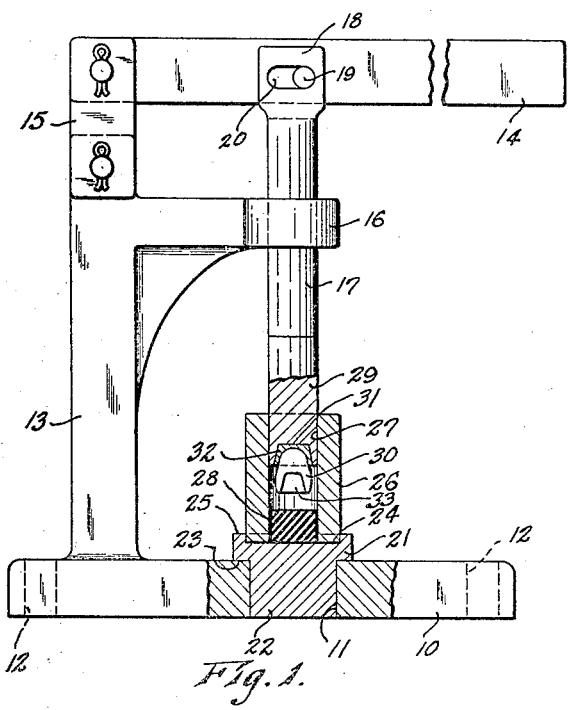
Figure 2:
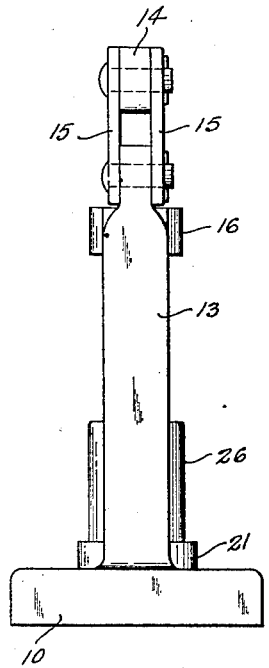
Fig. 2 is a rear elevation of the same looking from the left of Fig. 1.

In the specific construction shown, which, however, is capable of considerable variation without departing from the spirit of my invention, there is a base 10 having an opening 11 therethrough, and if desired this base may be secured to a table or bench by suitable screws passing through the opening 12. Extending upwardly from the base is a standard 13 to the upper end of which is pivoted a lever 14 by means of a pair of links 15. This connection allows the lever to not only swing in relation to the standard but also to have a certain lateral movement. Extending forwardly from the standard is a guide 16 having an opening therethrough for a plunger 17 and in which opening this plunger is guided for vertical reciprocation. The plunger is forked at its upper end, as shown at 18, to embrace the lever and to which it is connected by a transverse pin 19 projecting into slots 20 in the sides of the fork. Mounted on the base is a supporting member 21 which has a reduced portion 22 extending into the opening 11 and providing a shoulder 23 to rest on the upper surface of the base. On its upper surface this support is cupped or recessed, as shown at 24, leaving a flange 25. Arranged to be seated within this flange is a holder 26 for inlay wax. This holder is an open ended tube so that the passage 27 extends entirely through the same, and this passage is adapted to receive and hold the inlay wax 28 and also a die block 29 in which the metal die 30 is mounted. This die block is made to fit the passage 27 in the holder and to slide therein. It is provided with a recess 31 in one end to receive a suitable material, for example, modeling compound indicated at 32 which will hold the die in the recess.

The device is operated as follows: After the cavity in the tooth has been properly prepared an impression of this cavity is made in modeling compound as this compound will flow sufficiently to give an accurate impression of the surface of the cavity. It is very difficult to secure a perfect impression of this cavity with inlay wax as this wax will not flow sufficiently to properly and completely fill or conform to the irregularities and recesses in the surface of the cavity under the pressures which are available. As indicated above, however, an accurate impression may be made with the modeling compound, but it is necessary to make a wax reproduction of this impression in order to secure a mold for casting the inlay.

Figures 3, 4:
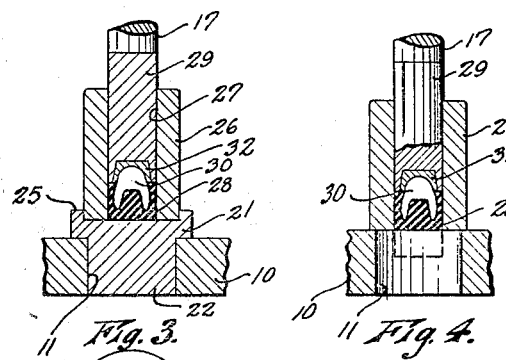
Fig. 3 is a vertical section through the die block and wax holder showing how the die is forced into the wax.
Fig. 4 is a similar view illustrating how the die may be removed from the holder.
Figures 6, 7:
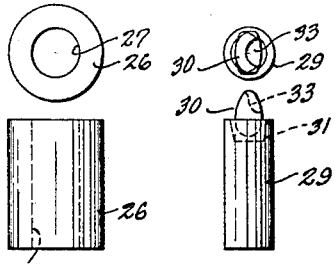
Fig. 6 is a side elevation and top plan view of the wax holder.
Fig. 7 is a side elevation and top plan view of the die block with the die in position.
Figures 5, 8:
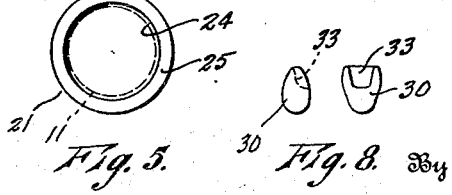
Fig. 5 is a top plan view of the support for the holder.
Fig. 8 is a side and front elevation of a die.

After the impression of the tooth and the cavity therein has been taken with the modeling compound a die is made from this impression, usually of silver, and it will be apparent that this die is substantially a reproduction of the tooth and the prepared cavity therein. This is the die indicated at 30 in the drawing, and it is secured in the recess 31 in the end of the die block 29 by modeling compound or other suitable material 32 as described. The cavity in this die indicated at 33 is an exact reproduction of the cavity in the tooth. A plug or block of special inlay wax 28 is placed within the holder 26, this wax being first made sufficiently plastic, so that it will flow under pressure as desired, by warming it to the proper temperature, and then the holder is placed within the recess in the supporting member 21, as indicated in Fig. 1. This support, as will be apparent, closes the lower open end of the holder and the wax will be confined by the holder and the support. The die block 29 with the die 30 is then inserted in the upper end of the holder 26 with the die down, as indicated in Fig. 1. The lever 14 is then depressed forcing the plunger 17 against the end of the die block and pressing the die into the wax under a high pressure, as indicated in Fig. 3. As the wax is confined the pressure will be equal in all directions and it will be forced into all the irregularities and recesses in the surface of the cavity in the die so that the surface of the wax will be an exact duplicate of the surface in the cavity. After the wax has cooled the die block and the wax is removed from the holder. If for any reason the wax should stick in the holder the supporting member 21 may be removed from the base and the holder placed over the opening 11 as indicated in Fig. 4. It will be apparent that then the die block and the wax may be easily forced out the lower end of the holder by means of the plunger and the lever. Therefore, the opening 11 in the base should be larger than the passage 27 in the holder 26 but smaller than the outside diameter of this holder. It is to be noted that the passageway in the holder is made in different sizes for different sizes of teeth, the outside diameter remaining the same.

Of course, the amount of the wax placed in the holder is gauged according to the size of the inlay, but an excess of wax is used so that there will be sufficient to allow for carving of the outside or biting surface of the inlay as desired. After the die and the wax plug is removed from the holder this excess of wax is carved by hand to give the desired shape and contour to the biting or exposed surface of the inlay. The inlay form in the die is then exactly of the shape and size of the gold inlay which is to be placed in the tooth. This wax form or pattern is then removed from the die and embedded in the regular investment material which sets about this form. This wax is of such a material that when this mold is heated the wax is entirely dissipated in or absorbed by the investment material leaving a cavity in the mold which is an exact duplicate of the inlay to be placed in the tooth. The gold inlay is then cast by forcing molten gold into this cavity with any one of the casting machines now on the market.

It will be apparent that because of this device I am enabled to force the inlay wax into all parts of the cavity in the die which is an exact duplicate of the cavity in the tooth. I can, therefore, secure a form or pattern made of this inlay wax which is an exact duplicate of the cavity in the tooth, so that the metal inlay which is cast from this form or pattern will exactly fit the cavity, and all that is necessary is to secure it in the cavity with a thin film of cement. This inlay will so exactly fit the cavity that there is no space between the surfaces, and the inlay is practically a continuation of the tooth.

Having thus set forth the nature of my invention, what I claim is:

1. In a device for making wax forms for inlays, a holder for inlay wax, a block, a separate die having a cavity therein carried by the block, said holder being arranged to confine the wax and guide the block for reciprocatory movement, and means for forcing the die into the wax to cause the wax to fill all parts of the cavity.

2. In a device for making wax forms for inlays, a holder for inlay wax comprising an open ended tube, a support for the tube arranged to close one end thereof, a block mounted to enter and close the tube at the opposite end and carry a die having a cavity, and means for exerting pressure on the outer end of the block to press the die into the wax and force the wax into all parts of the cavity to fill the same.

3. In a device for making wax forms for inlays, a base, a cupped member mounted on the base, a holder for inlay wax comprising an open ended tube adapted to seat in said cupped member and be closed thereby, a block carrying a die having a cavity mounted to slide in said tube and close the other end thereof, a standard secured to the base, and means carried by the standard for exerting pressure on the block to press the die into the wax and force the wax into the cavity to fill the same.

4. In a device for making wax forms for inlays, a base having an opening, a supporting member having a portion extending into said opening, a holder for inlay wax comprising an open ended tube adapted to seat at one end on the supporting member and be closed thereby, a block mounted to slide in and close said tube and adapted to carry a die having a cavity, the opening in the base being greater than the opening in the tube and smaller than the outer diameter of the tube, and means secured to the base for exerting pressure on the block to press the die into the wax and force the wax into the cavity to fill the same.

5. In a device for making wax forms for inlays, a base, a holder for inlay wax comprising an open ended tube, a support for the tube on the base arranged to close one end thereof, a block mounted to enter and close the tube at the opposite end and carry a die having a cavity, an upright standard mounted on the base, a guide on the standard, a plunger mounted in said guide and arranged to engage the outer end of the block, and a lever pivoted to the standard and connected to the plunger to force the plunger against the block and press the die into the wax.

6. In a device for making wax forms for inlays, a base, a holder for inlay wax comprising an open ended tube, a support for the tube on the base having a flange to embrace one end of the tube, said support being also arranged to close the end of the tube, a block mounted to slide in and close the tube from the opposite end and carry a die having a cavity, an upright standard mounted on the base, a guide on the standard, a plunger mounted in said guide and adapted to engage the end of the block, and a lever pivoted to the standard and connected to the plunger to force the plunger against the block and press the die into the wax to force the wax into the cavity to fill the same.

7. In a device for making wax forms for inlays, a holder for inlay wax comprising an open ended tube, means for supporting the tube and closing one end thereof, a block adapted to slide in and close the tube and having a recess in one end to hold adhesive material for securing a die, a die mounted in the block by said material and means for exerting a pressure on the other end of the block to force the die into the wax.

In testimony whereof I affix my signature.

ROY E. TUTHILL.